(12) United States Patent
Chiou

(10) Patent No.: US 7,112,929 B2
(45) Date of Patent: Sep. 26, 2006

(54) FULL-BRIDGE AND HALF-BRIDGE COMPATIBLE DRIVER TIMING SCHEDULE FOR DIRECT DRIVE BACKLIGHT SYSTEM

(75) Inventor: Chii-Fa Chiou, Lake Forest, CA (US)

(73) Assignee: Microsemi Corporation, Irvine, CA (US)

( * ) Notice: Subject to any disclaimer, the term of this patent is extended or adjusted under 35 U.S.C. 154(b) by 48 days.

(21) Appl. No.: 11/090,246

(22) Filed: Mar. 25, 2005

(65) Prior Publication Data

US 2005/0218825 A1 Oct. 6, 2005

Related U.S. Application Data

(60) Provisional application No. 60/558,512, filed on Apr. 1, 2004.

(51) Int. Cl.
H05B 37/02 (2006.01)

(52) U.S. Cl. .................. 315/224; 315/226; 315/DIG. 7

(58) Field of Classification Search ................. None
See application file for complete search history.

(56) References Cited

U.S. PATENT DOCUMENTS

| | | | |
|---|---|---|---|
| 5,615,093 A | 3/1997 | Nalbant | |
| 5,619,402 A | 4/1997 | Liu | |
| 5,892,336 A | 4/1999 | Lin et al. | |
| 5,923,129 A | 7/1999 | Henry | |
| 5,930,121 A | 7/1999 | Henry | |
| 6,104,146 A | 8/2000 | Chou et al. | |
| 6,114,814 A | 9/2000 | Shannon et al. | |
| 6,198,234 B1 | 3/2001 | Henry | |
| 6,259,615 B1 | 7/2001 | Lin | |
| 6,307,765 B1 | 10/2001 | Choi | |
| 6,316,881 B1 | 11/2001 | Shannon et al. | |
| 6,396,722 B1 | 5/2002 | Lin | |
| 6,459,216 B1 | 10/2002 | Tsai | |
| 6,469,922 B1 | 10/2002 | Choi | |
| 6,515,881 B1 | 2/2003 | Chou et al. | |
| 6,531,831 B1 | 3/2003 | Chou et al. | |
| 6,559,606 B1 | 5/2003 | Chou et al. | |
| 6,570,344 B1 | 5/2003 | Lin | |
| 6,593,703 B1 * | 7/2003 | Sun | ............................. 315/224 |
| 6,633,138 B1 | 10/2003 | Shannon et al. | |
| 6,969,958 B1 * | 11/2005 | Henry | ........................ 315/291 |
| 2002/0180380 A1 | 12/2002 | Lin | |
| 2003/0161164 A1 | 8/2003 | Shannon et al. | |

* cited by examiner

*Primary Examiner*—David Vu
(74) *Attorney, Agent, or Firm*—Knobbe, Martens, Olson & Bear, LLP.

(57) ABSTRACT

A driver circuit or controller flexibly drives either a half-bridge or a full-bridge switching network in a backlight inverter without modification, redundant circuitry or additional components. The driver circuit includes four outputs to provide four respective driving signals that establish a periodic timing sequence using a zero-voltage switching technique for semiconductor switches in the switching network.

20 Claims, 12 Drawing Sheets

FULL-BRIDGE AND HALF-BRIDGE COMPATIBLE DRIVER TIMING SCHEDULE FOR DIRECT DRIVE BACKLIGHT SYSTEM

CLAIM FOR PRIORITY

This application claims the benefit of priority under 35 U.S.C. § 119(e) of U.S. Provisional Application No. 60/558,512, filed on Apr. 1, 2004, and entitled "Full-Bridge and Half-Bridge Compatible Driver Timing Schedule for Direct Drive Backlight System," the entirety of which is incorporated herein by reference.

BACKGROUND

1. Field of the Invention

The invention generally relates to a driver circuit in a backlight system for powering fluorescent lamps, and more particularly, relates to a driver circuit with a power efficient timing schedule that can flexibly drive either a half-bridge or a full-bridge switching network in the backlight system.

2. Description of the Related Art

Fluorescent lamps are used in a number of applications where light is required but the power required to generate the light is limited. One particular type of fluorescent lamp is a cold cathode fluorescent lamp (CCFL). CCFLs are used for back or edge lighting of liquid crystal displays (LCDs) which are typically found in notebook computers, web browsers, automotive and industrial instrumentation, and entertainment systems.

A power converter (e.g., an inverter) is typically used to power a fluorescent lamp. The inverter includes a controller and a switching network to convert a direct current (DC) source into an alternating current (AC) source to power the fluorescent lamp. In a half-bridge switching network, a pair of transistors is coupled to the DC source and the transistors alternately conduct to generate the AC source. In a full-bridge switching network, an arrangement of four transistors is coupled to the DC source and the transistors conduct in pairs to generate the AC source. The controller controls transistors in the switching network. Controllers designed for half-bridge switching networks typically cannot operate full-bridge switching networks, and controllers designed for full-bridge switching networks typically do not have outputs compatible for operating half-bridge networks.

SUMMARY

Embodiments advantageously include driver circuits (or controllers) that can switch between half-bridge and full-bridge operations without modification, redundant circuitry or additional components. In one embodiment, a controller for flexibly driving a half-bridge or a full-bridge switching network in a backlight inverter includes four outputs. A first output of the controller provides a first driving signal with periodic active and inactive states. A second output of the controller provides a second driving signal with active states that are phase shifted by approximately 180° with respect to the active states of the first driving signal. The first and the second driving signals have variable and substantially identical duty cycles that determine relative durations of the active and the inactive states.

A third output of the controller provides a third driving signal that substantially follows the first driving signal with opposite states and transition overlaps. For example, the first driving signal and the third driving signal are alternately active with overlapping inactive states during state transitions. The third driving signal transitions from an active state to an inactive state before the first driving signal transitions from an inactive state to an active state. The third driving signal also transitions from an inactive state to an active state after the first driving signal transitions from an active state to an inactive state.

A fourth output of the controller provides a fourth driving signal that substantially follows the second driving signal with opposite states and transitions overlaps. For example, the second driving signal and the fourth driving signal are alternately active with overlapping inactive states during state transitions. The fourth driving signal transitions from an active state to an inactive state before the second driving signal transitions from an inactive state to an active state. The fourth driving signal also transitions from an inactive state to an active state after the second driving signal transitions from an active state to an inactive state.

In one embodiment, a first semiconductor switch (or power transistor) and a second semiconductor switch are arranged in a half-bridge switching network of a direct-drive inverter. For example, the semiconductor switches are coupled between ground and respective opposite terminals of a primary winding of a transformer. A power source (e.g., a supply voltage or a current source) is coupled to a center tap of the primary winding of the transformer. A lamp load (e.g., one or more fluorescent lamps or cold cathode fluorescent lamps) is coupled across a secondary winding of the transformer.

The semiconductor switches (e.g., N-type transistors) in the half-bridge switching network can be advantageously controlled by the first driving signal and the second driving signal to generate an AC signal for powering the lamp load. For example, the first driving signal and the second driving signal cause the first semiconductor switch and the second semiconductor switch to alternately conduct. Power flows from the power source to the lamp load in a first polarity when the first semiconductor switch is on and the second semiconductor switch is off. Power flows from the power source to the lamp load in a second polarity when the second semiconductor switch is on and the first semiconductor switch is off. Substantially no power flows from the power source to the lamp load when both semiconductor switches are on or off.

In one embodiment, four semiconductor switches are coupled to a primary winding of a transformer in a full-bridge configuration. The four driving signals respectively control the four semiconductor switches to generate an AC lamp signal for powering a lamp load coupled across a secondary winding of the transformer. For example, the first driving signal controls the first semiconductor switch coupled between a first terminal of the primary winding and ground. The second driving signal controls the second semiconductor switch coupled between a second terminal of the primary winding and ground. The third driving signal controls the third semiconductor switch coupled between a power source and the first terminal of the primary winding. Finally, the fourth driving signal controls the fourth semiconductor switch coupled between the power source and the second terminal of the primary winding.

The four driving signals establish a periodic timing sequence that advantageously improves power efficiency. For example, the transition overlaps between the first and the third driving signals and the transitions overlaps between the second and the fourth driving signals facilitate reduced-voltage (or zero-voltage) switching to improve power efficiency. Conduction states and idles states are interposed between the different transition overlaps in the periodic timing sequence. For example, a first conduction state allows power to flow from the power source to the lamp load in a first polarity when the first and the fourth semiconductor switches are on while the second and the third semiconductor switches are off. A second conduction state allows power to flow from the power source to the lamp load in an opposite polarity when the first and the fourth semiconductor switches are off while the second and the third semiconductor switches are on. Substantially no power is provided by the power source during the idle states in which the first and the second semiconductor switches are on or the third and the fourth semiconductor switches are on.

In one embodiment, the first and the second semiconductor switches are N-type field-effect-transistors (NFETs) while the third and the fourth semiconductor switches are P-type FETs (PFETs). Thus, the active states of the first and the second driving signals correspond to logic high while the active states of the third and the fourth driving signals correspond to logic low. The third and the fourth driving signals have rising edges that precede respective rising edges of the first and the second driving signals by a first duration. The third and the fourth driving signals have falling edges that trail respective falling edges of the first and the second driving by a second duration.

In one embodiment, the four driving signals are generated from a pair of input signals and four delay circuits. For example, a first input signal is provided to a first delay circuit that is coupled in series with a second delay circuit. A second input signal is provided to a third delay circuit that is coupled in series with a fourth delay circuit.

In one application in which the first and the second driving signals have overlapping inactive states, the first delay circuit outputs the first driving signal. An output of the second delay circuit is ORed with the first input signal to generate the third driving signal. The third delay circuit outputs the second driving signal. An output of the fourth delay circuit is ORed with the second input signal to generate the fourth driving signal.

In another application in which the first and the second driving signals have overlapping inactive states, the first delay circuit outputs the first driving signal. The output of the second delay circuit is provided to a first edge-triggered one-shot circuit that has an output coupled to a reset terminal of a first SR latch. The first input signal is provided to a set terminal of the first SR latch. The first SR latch outputs the third driving signal. The third delay circuit outputs the second driving signal. The output of the fourth delay circuit is provided to a second edge-triggered one-shot circuit that has an output coupled to a reset terminal of a second SR latch. The second input signal is provided to a set terminal of the second SR latch. The second SR latch outputs the fourth driving signal.

In one application in which the first and the second driving signals have overlapping active states, the output of the first delay circuit is inverted to generate the fourth driving signal. The output of the second delay circuit is NORed with the first input signal to generate the second driving signal. The output of the third delay circuit is inverted to generate the third driving signal. The output of the fourth delay circuit is NORed with the second input signal to generate the first driving signal.

In another application in which the first and the second driving signals have overlapping active states, the output of the first delay circuit is inverted to generate the fourth driving signal. The output of the second delay circuit is provided to a first one-shot circuit that has an output coupled to a reset terminal of a first latch. The first input signal is coupled to a set terminal of the first latch. The first latch generates the second driving signal. The output of the third delay circuit is inverted to generate the third driving signal. The output of the fourth delay circuit is provided to a second one-shot circuit that has an output coupled to a reset terminal of a second latch. The second input signal is provided to a set terminal of the second latch. The second latch generates the first driving signal.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate embodiments and are not intended to be limiting.

DETAILED DESCRIPTION OF EMBODIMENTS

Although particular embodiments are described herein, other embodiments, including embodiments that do not provide all of the benefits and features set forth herein, will be apparent to those of ordinary skill in the art.

Figure 1:
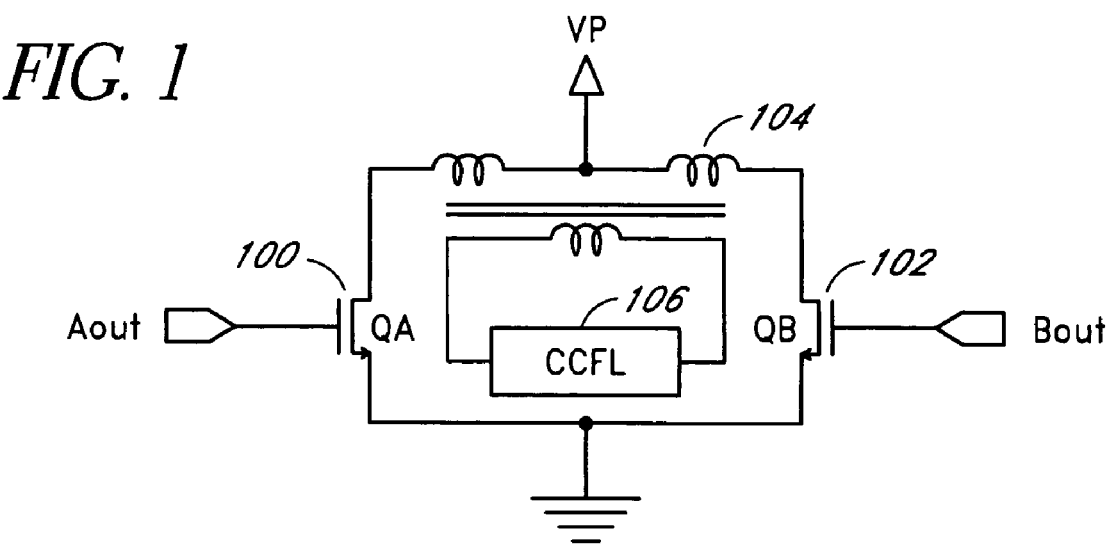
FIG. 1 illustrates one embodiment of a direct drive backlight system implemented with a half-bridge switching network.

FIG. 1 illustrates one embodiment of a direct drive backlight system implemented with a half-bridge switching network. Two power transistors (or semiconductor switches) 100, 102 are coupled between circuit ground and respective opposite terminals of a primary winding of a transformer 104. A power source (VP) is coupled to a center tap of the primary winding of the transformer 104. The power source can be a supply voltage or a current source. A lamp load 106 is coupled across a secondary winding of the transformer 104. The lamp load 106 can include one or more lamps, such as fluorescent lamps or CCFLs. Other half-bridge network configurations including two power transistors are also possible and may exclude a transformer for coupling to a lamp load.

A controller (not shown) outputs two driving signals to control the semiconductor switches 100, 102. For example, the first driving signal (Aout) controls the first semiconductor switch (QA) 100 and the second driving signal (Bout) controls the second semiconductor switch (QB) 102. The driving signals configured the semiconductor switches 100, 102 to alternately conduct to establish an AC current in the primary winding and the second winding of the transformer 104. In a first conduction state, power flows from the power source (or supply source) to the lamp load 106 in a first polarity when the first semiconductor switch 100 is on and the second semiconductor switch 102 is off. In a second conduction state, power flows from the power source to the lamp load 106 in a second (or opposite) polarity when the second semiconductor switch 102 is on and the first semiconductor switch 100 is off. Idle (or power-off) states can be inserted in between the conduction states. During the idle states, the semiconductor switches 100, 102 are both on (e.g., if the power source is a current source) or both off (e.g., if the power source is a voltage source) and substantially no power flows from the power source to the lamp load 106.

Figure 2:
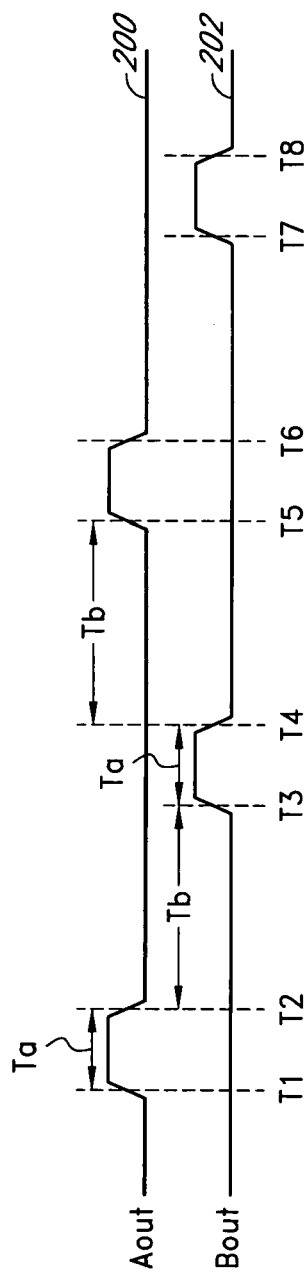
FIG. 2 illustrates one timing scheme for driving power transistors in the half-bridge switching network of FIG. 1.

FIG. 2 illustrates one timing scheme for driving (or controlling conduction states of) the power transistors 100, 102 in the half-bridge switching network of FIG. 1. In the embodiment shown in FIG. 1, the power transistors 100, 102 are NFETs with driving signals coupled to respective gate terminals of the power transistors 100, 102. Logic high in the driving signals corresponds to turning on the power transistors 100, 102 (or an active state) while logic low in the driving signals corresponds to turning off the power transistors 100, 102 (or an inactive state).

A graph 200 illustrates a first driving signal (Aout) with respect to time for driving the first power transistor 100. A graph 202 illustrates a second driving signal (Bout) with respect to time for driving the second power transistor 102. The driving signals are periodically and alternately active (or logic high) for a first predetermined duration (Ta). For example, the first driving signal is active for the first predetermined duration during times T1–T2 and T5–T6. The second driving signal is active for the first predetermined duration during times T3–T4 and T7–T8. Rest periods of a second predetermined duration (Th) are inserted in between the alternate active states of the driving signals (e.g., during times T2–T3, T4–T5 and T6–T7). The driving signals are both inactive (or logic low) during the rest periods. Alternately, the driving signals can be both active during the rest periods.

Thus, the power transistors 100, 102 alternately switch on (or conduct) between periods of rest using the timing scheme illustrated in FIG. 2. Power flows from the power source to the lamp load 106 in a first polarity when the first driving signal is active. Power flows from the power source to the lamp load 106 in a second polarity when the second driving signal is active. Substantially no power flows from the power source to the lamp load 106 when the first and the second driving signals are both active or both inactive. The alternating conduction by the power transistors 100, 102 between the rest periods results in a substantially AC waveform for powering the lamp load 106. An AC current (or lamp current) flows through a lamp in the lamp load 106 to illuminate the lamp. The brightness or effective power delivered to the lamp is dependent on the power source and switching duty-cycle (i.e., Ta/Tb).

Figure 3:
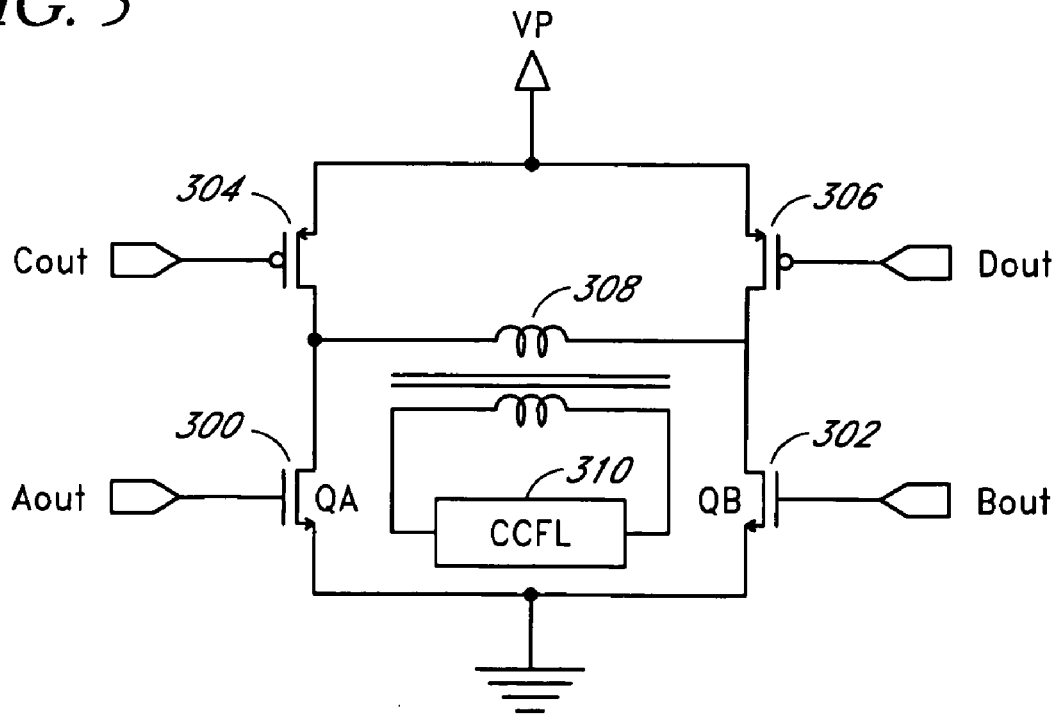
FIG. 3 illustrates one embodiment of a direct drive backlight system implemented with a full-bridge switching network.

FIG. 3 illustrates one embodiment of a direct drive backlight system implemented with a full-bridge (or H-bridge) switching network. Four power transistors 300, 302, 304, 306 are coupled to a primary winding of a transformer 308. For example, a first pair of power transistors (QA, QB) 300, 302 is coupled between respective opposite terminals of the primary winding and circuit ground. A second pair of power transistors (QC, QD) 304, 306 is coupled between the respective opposite terminals of the primary winding and a power source (VP) to complete the H-bridge switching network. A lamp load (e.g., a fluorescent lamp) 310 is coupled across a secondary winding of the transformer 308.

Four driving signals (Aout, Bout, Cout, Dout) respectively control the four power transistors 300, 302, 304, 306 to generate an AC lamp signal for powering the lamp load 310 coupled across the secondary winding of the transformer 308. For example, the first driving signal (Aout) controls the first power transistors (QA) 300 coupled between a first terminal of the primary winding and ground. The second driving signal (Bout) controls the second power transistor (QB) 302 coupled between a second terminal of the primary winding and ground. The third driving signal (Cout) controls the third power transistor (QC) 304 coupled between the power source and the first terminal of the primary winding. Finally, the fourth driving signal (Dout) controls the fourth power transistor (QD) 306 coupled between the power source and the second terminal of the primary winding.

A full-bridge switching network has some advantages over a half-bridge switching network. For example, the transformer 308 of FIG. 3 generally costs less than the transformer 104 of FIG. 1 due to reduced primary-to-secondary turns ratio and lack of a center tap. Power transistors used in the full-bridge switching network generally cost less than power transistors used in the half-bridge switching network due to reduced breakdown voltage requirement. The power transistors in the half-bridge switching network have a breakdown voltage that is comparable to at least twice a supply voltage while the power transistors in the full-bridge switching network have a breakdown voltage that is comparable to at least the supply voltage.

Figure 4:
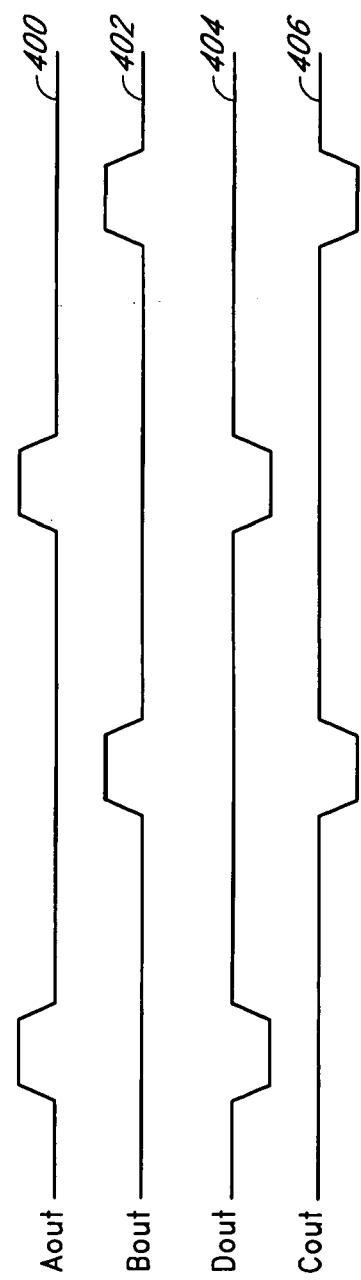
FIG. 4 illustrates one timing scheme for controlling power transistors in the full-bridge switching network of FIG. 3.

FIG. 4 illustrates one timing scheme for controlling the power transistors 300, 302, 304, 306 in the full-bridge switching network of FIG. 3. In the embodiment shown in FIG. 3, the first pair of power transistors 300, 302 are NFETs and the second pair of power transistors 304, 306 are PFETs. The driving signals (Aout, Bout, Cout, Dout) are coupled to respective gate terminals of the power transistors 300, 302, 304, 306. Logic high in the first two driving signals (Aout, Bout) corresponds to turning on the first pair of power transistors 300, 302 (or an active state). Logic low in the last two driving signals (Cout, Dout) corresponds to turning on the second pair of power transistors 304, 306 (or an active state).

A graph 400 illustrates the first driving signal (Aout) with respect to time for driving the first power transistor 300. A graph 402 illustrates the second driving signal (Bout) with respect to time for driving the second power transistor 302. A graph 404 illustrates the fourth driving signal (Dout) with respect to time for driving the fourth power transistor 306. A graph 406 illustrates the third driving signal (Cout) with respect to time for driving the third power transistor 304. The first and the second driving signals illustrated in FIG. 4 is substantially similar to the driving signals illustrated in FIG. 2 for the half-bridge switching network. The fourth driving signal is an inverted form of the first driving signal, and the third driving signal is an inverted form of the second driving signal. Thus, the first and the fourth power transistors 300, 306 are switched on and off at approximately the same times while the second and the third power transistors 302, 304 are switched on and off at approximately the same times.

Referring to FIG. 3, current flows from the second terminal to the first terminal of the primary winding of the transformer 308 and power transfers from the power source to the lamp load 310 in a first polarity during first conduction states when the first driving signal is logic high (or active) and the fourth driving signal is logic low (or active). Current flows from the first terminal to the second terminal of the primary winding of the transformer 308 and power transfers from the power source to the lamp load 310 in a second polarity during second conduction states when the second driving signal is logic high (or active) and the third driving signal is logic low (or active). Substantially no power transfers from the power source to the lamp load 310 during idle states when the first and the second driving signals are both inactive (or logic low) as shown in FIG. 4.

FIGS. 5(a)–5(h) illustrate one embodiment of a periodic timing sequence for the full-bridge switching network of FIG. 3 that employs a zero-voltage switching technique to generate an AC lamp signal for powering the lamp load 310 with improved power efficiency. The power transistors 300, 302, 304, 306 are represented by schematically equivalent single-pole-single-throw switches. The lamp load 310 coupled across the transformer 308 is not shown for clarity of illustration.

Figure 5A:
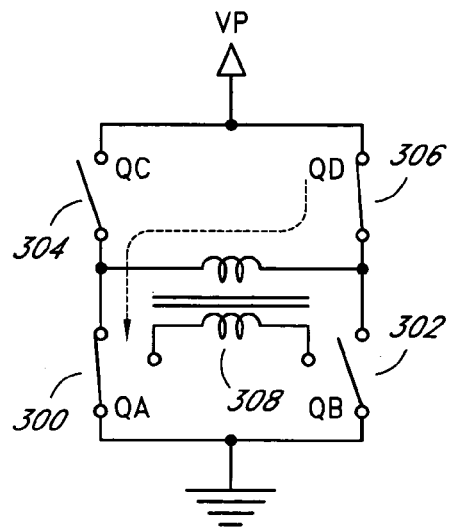
FIGS. 5(a)–5(h) illustrate one embodiment of a periodic timing sequence for a full-bridge switching network employing a zero-voltage switching technique to improve power efficiency.
Figure 5B:
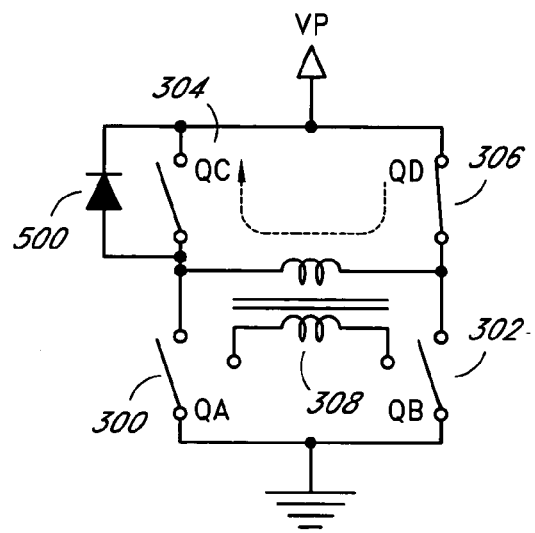
Figure 5C:
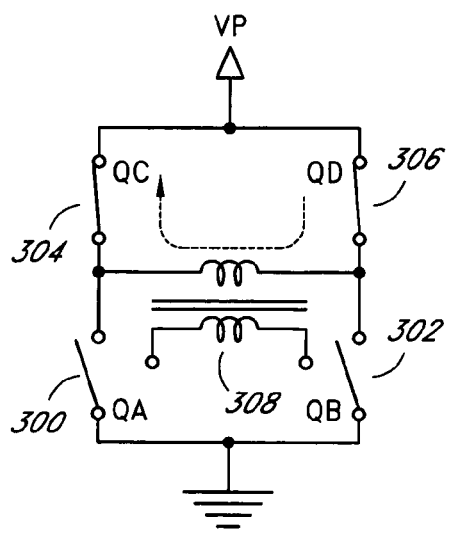
Figure 5D:
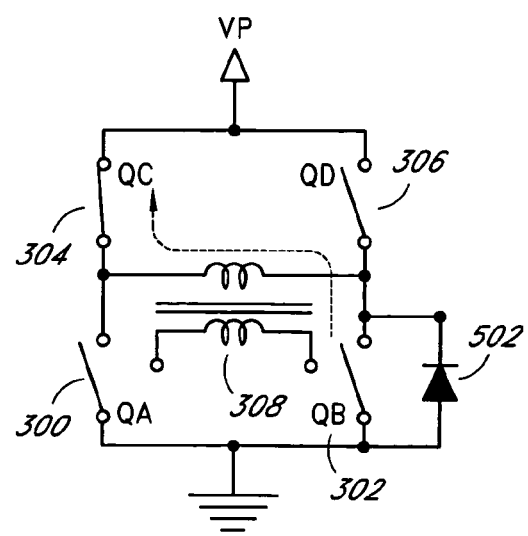

FIG. 5(a) illustrates a first conduction state (or step) in which the first transistor (QA) 300 and the fourth power transistor (QD) 306 are on while the second transistor (QB) 302 and the third power transistor (QC) 304 are off to allow power to flow from the power source (VP) to the lamp load 310 in a first polarity. For example, current flows from the power source through the fourth power transistor 306, through the primary winding of the transformer 308 and through the first power transistor 300 to ground during the first conduction state. FIGS. 5(b)–5(d) illustrate intermediate steps to transition from the first conduction state to a second conduction state illustrated in FIG. 5(e).

FIG. 5(b) shows a first transition state (or first intermediate step), following the first conduction state, in which the first power transistor 300 turns off. Because of leakage inductance associated with the transformer 308, the current through the primary winding of the transformer 308 does not stop instantaneously. The current flowing through the primary winding of the transformer 308 finds a path through a body diode 500 of the third power transistor 304 and back to the power source. The body diode 500 has an anode coupled to the first terminal of the primary winding and a cathode coupled to the power source. With the body diode 500 conducting, the drain-to-source voltage of the third power transistor 304 is relatively low (e.g., approximately 0.7 volt or one diode voltage drop).

FIG. 5(c) shows a first idle state (or second intermediate step), following the first transition state, in which the third power transistor 304 turns on. Turning on the third power transistor 304 after its body diode 500 starts conducting takes advantage of close to zero (or reduced) voltage switching to thereby reduce switching loss. It should be noted that although current continues to flow through the primary winding of the transformer 308 during the idle state, no power is drawn from the power source.

FIG. 5(d) shows a second transition state (or third intermediate step), following the first idle state, in which the fourth power transistor 306 turns off. Similar to the first transition step, the current flowing through the primary winding of the transformer 308 does not stop abruptly. The current flowing through the primary winding of the transformer 308 finds a path from ground through a body diode 502 of the second power transistor 302. The body diode 502 has an anode coupled to ground and a cathode coupled to the second terminal of the primary winding.

Figure 5E:
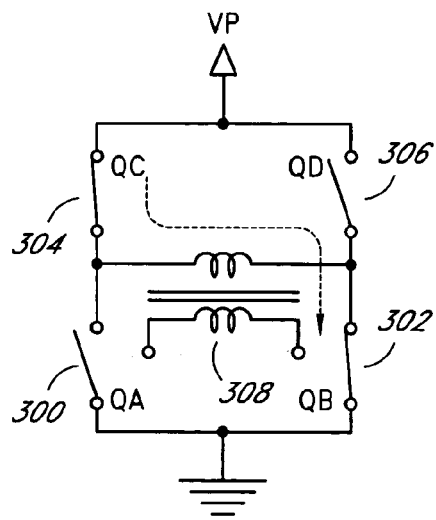

FIG. 5(e) shows the second conduction state, following the second transition state, in which the second power transistor 302 turns on to allow power to flow from the power source to the lamp load 310 in a second polarity. The second power transistor 302 turns on after its body diode 502 starts conducting to take advantage of reduced-voltage (or zero-voltage) switching. In the second conductions state, current flows from the power source through the third power transistor 304, through the primary winding of the transformer 308 and through the second power transistor 302 to ground. The current flows in opposite (or reverse) directions through the primary winding of the transformer 308 between the first and the second conduction states.

Figure 5F:
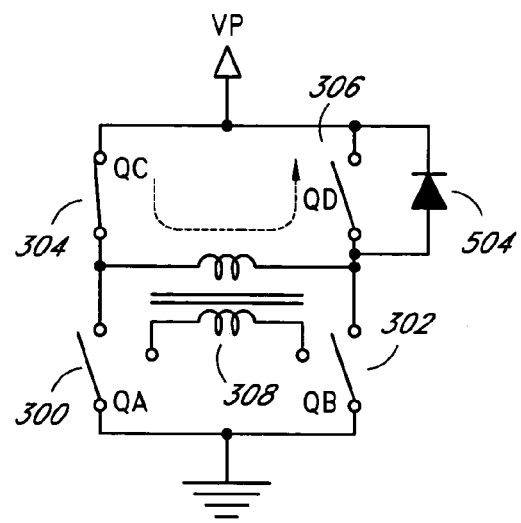
Figure 5G:
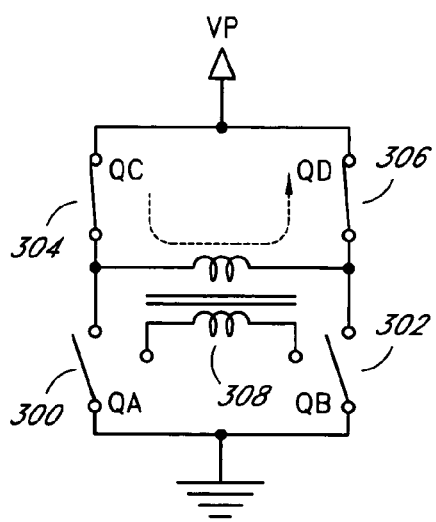
Figure 5H:
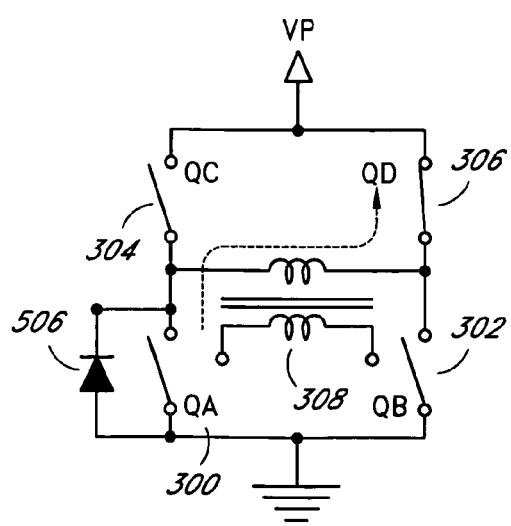

FIGS. 5(f)–5(h) illustrate another set of intermediate steps, following the same principles shown in FIG. 5(b)–5(d), to transition from the second conduction state back to the first conduction state. For example, FIG. 5(f) shows a third transition state, following the second conduction state, in which the second power transistor 302 turns off and the current flowing the primary winding of the transformer 308 finds a path to the power source through a body diode 504 of the fourth power transistor 306. The body diode 504 has an anode coupled to the second terminal of the primary winding and a cathode coupled to the power source. FIG. 5(g) shows a second idle state, following the third transition state, in which the fourth power transistor 306 turns on using zero-voltage switching.

FIG. 5(h) shows a fourth transition state, following the second idle state, in which the third power transistor 304 turns off and the current flowing through the primary winding of the transformer 308 finds a path to ground through a body diode 506 of the first power transistor 300. The body diode 506 has an anode coupled to ground and a cathode coupled to the first terminal of the primary winding. The first power transistor 300 turns on using zero-voltage switching in the next step of the periodic timing sequence to return to the first conduction state. The zero-voltage switching technique turns on (or closes) a power transistor (or switch) when the voltage across the power transistor (or source-to-drain voltage of a FET) is at a minimum (or reduced) voltage (e.g., 0.7 volt or substantially zero volt). The zero-voltage switching technique reduces switching power loss due to discharging of the drain-to-source capacitance associated with turning on the power transistor.

Figure 6:
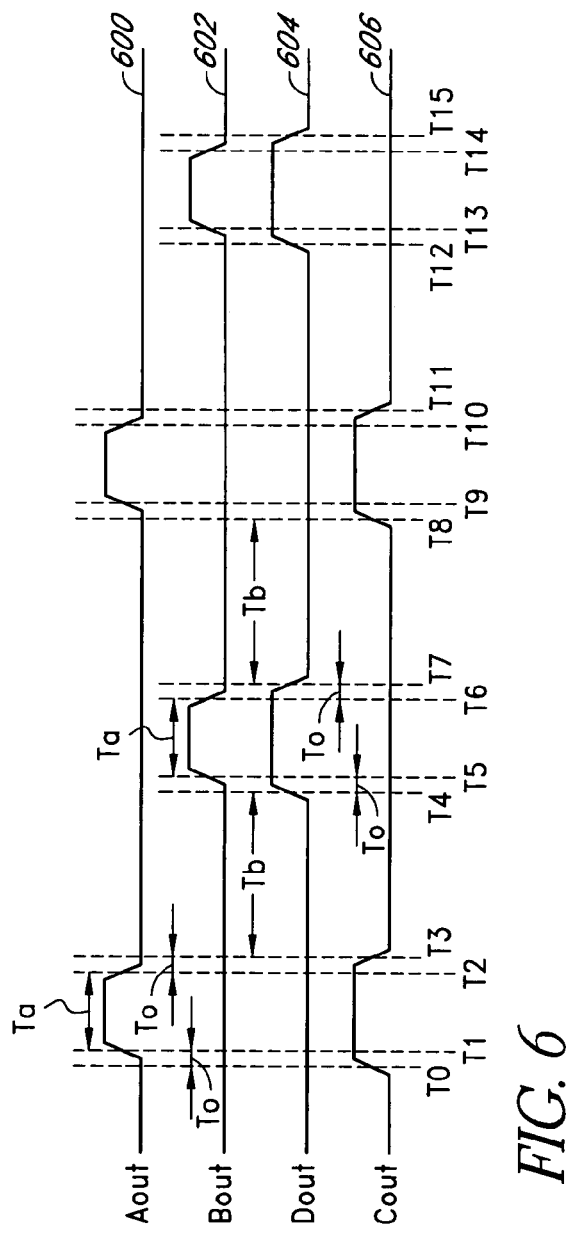
FIG. 6 illustrates one embodiment of driving waveforms to control transistors in a full-bridge switching network in accordance with the periodic timing sequence depicted in FIGS. 5(a)–5(h).

FIG. 6 illustrates one embodiment of driving waveforms to control transistors in a full-bridge switching network in accordance with the periodic timing sequence depicted in FIGS. 5(a)–5(h). For example, a controller includes four outputs to drive the full-bridge switching network in a backlight inverter. The controller can also flexibly drive a half-bridge switching network with two of the four outputs. The first output of the controller provides a first driving signal (Aout) with periodic active and inactive states. The first driving signal has a variable duty-cycle that determines relative durations of the active and the inactive states, which is one way to control backlight intensity (or amount of power provided to the lamp load 310). A graph 600 illustrates the first driving signal with respect to time. In one embodiment, the first driving signal controls the first power transistor 300 which is shown as an NFET with logic high corresponding to active states. The graph 600 shows the first driving signal with periodic active states of a first duration (Ta) (e.g, from times T1–T2 and T9–T10).

The second output of the controller provides a second driving signal (Bout) that has a substantially identical duty-cycle as the first driving signal and is substantially an 180° phase-shifted version of the first driving signal. In other words, the active states of the second driving signal are phased shifted by approximately 180° with respect to the active states of the first driving signal to provided complementary switching. A graph 602 illustrates the second driving signal with respect to time. In one embodiment, the second driving signal controls the second power transistor 302 which is shown as an NFET with logic high corresponding to active states. The graph 602 shows the second driving signal with periodic active states of the first duration (Ta) (e.g., from times T5–T6 and T13–T14). The active states of the second driving signal is phase shifted by 180° from (or occurs in between) the active states of the first driving signal. The first and the second driving signals can advantageously be used to control alternating conduction by switches in a half-bridge switching network.

The third output of the controller provides a third driving signal (Cout) that substantially follows (or tracks) the first driving signal with opposite (or opposing) states and transition overlaps. A graph 606 shows the third driving signal. In one embodiment, the third driving signal controls the third power transistor 304 which is shown as a PFET with logic low corresponding to active states. With opposing states, the first power transistor 300 and the third power transistor 304 are alternately on. With transition overlaps, the third power transistor 304 turns off before the first power transistor 300 turns on and the third power transistor 304 turns on after the first power transistor 300 turns off.

The graph 606 shows the third driving signal with periodic inactive states that exceed the first duration (e.g., from times T0–T3 and T8–T11). Thus, the third driving signal is substantially similar to the first driving signal except the leading (or rising) edge of the third driving signal precedes the leading edge of the first driving signal by a first overlapping duration and the trailing (or falling) edge of the third driving signal succeeds the trailing edge of the first driving signal after a second overlapping duration. In other words, the third driving signal transitions from an active state (i.e., logic low) to an inactive state (i.e., logic high) before the first driving signal transitions from an inactive state (i.e., logic low) to an active state (i.e., logic high). The third driving signal also transitions from an inactive state to an active state after the first driving signal transitions from an active state to an inactive state. During the first and the second overlapping durations, the first and the third driving signals are both in inactive states.

The fourth output of the controller provides a fourth driving signal (Dout) that substantially follows the second driving signal with opposite states and transition overlaps. A graph 604 shows the fourth driving signal. In one embodiment, the fourth driving signal controls the fourth power transistor 306 which is shown as a PFET with logic low corresponding to active states. With opposite states, the second power transistor 302 and the fourth power transistor 306 are alternately on. With transition overlaps, the fourth power transistor 306 turns off before the second power transistor 302 turns on and the fourth power transistor 306 turns on after the second power transistor 302 turns off.

The graph 604 shows the fourth driving signal with periodic inactive states that exceed the first duration (e.g., from times T4–T7 and T12–T15). Thus, the fourth driving signal is substantially similar to the second driving signal except the leading edge of the fourth driving signal precedes the leading edge of the second driving signal by a third overlapping duration and the trailing edge of the fourth driving signal succeeds the trailing edge of the second driving signal after a fourth overlapping duration. In other words, the fourth driving signal transitions from an active state (i.e., logic low) to an inactive state (i.e., logic high) before the second driving signal transitions from an inactive state (i.e., logic low) to an active state (i.e., logic high). The fourth driving signal also transitions from an inactive state to an active state after the second driving signal transitions from an active state to an inactive state. During the third and the fourth overlapping durations, the second and the fourth driving signals are both in inactive states. FIG. 6 shows the four overlapping durations to have substantially identical time lengths (i.e., To). However, each of the overlapping durations can be a different time length.

Referring to FIG. 6 in conjunction with FIGS. 5(a)–5(h), the period of overlapping active states between the first and the fourth driving signals (e.g., from time T1–T2 or T9–T10) corresponds to the first conduction state shown in FIG. 5(a). The trailing edge transition overlaps between the first and the third driving signals (e.g., from times T2–T3 and T10–T11) correspond to the first transition state shown in FIG. 5(b). The first period of overlapping inactive states (or first rest period) between the first and the second driving signals (e.g., from time T3–T4 or T11–T12) corresponds to the first idle state shown in FIG. 5(c). The leading edge transition overlaps between the second and the fourth driving signals (e.g., from times T4–T5 and T12–T13) correspond to the second transition state shown in FIG. 5(d). The period of overlapping active states between the second and the third driving signals (e.g., from time T5–T6 or T13–T14) corresponds to the second conduction state shown in FIG. 5(e). The trailing edge transition overlaps between the second and the fourth driving signals (e.g., from times T6–T7 and T14–T15) correspond to the third transition state shown in FIG. 5(f). The second period of overlapping inactive states (or second rest period) between the first and the second driving signals (e.g., from time T7–T8) corresponds to the second idle state shown in FIG. 5(g). Finally, the leading edge transition overlaps between the first and the third driving signals (e.g., from times T0–T1 and T8–T9) correspond to the fourth transition state shown in FIG. 5(h).

As discussed above, power is drawn from the power source and delivered to the lamp load 310 through the transformer 308 during the first and the second conduction states (or power-on states). No net current flows out of the power source during the first and the second idle states (or power-off states). In addition to facilitating power efficiency by reduced-voltage switching, the four transition states help avoid shoot-through current associated with the first power transistor 300 and the third power transistor 304 (or the second power transistor 302 and the fourth power transistor 306) being on at substantially the same time. The duration of the transition states (or transition overlaps) are chosen to guarantee that one of the power transistors is turned off before the other power transistor is turned on.

Figure 7:
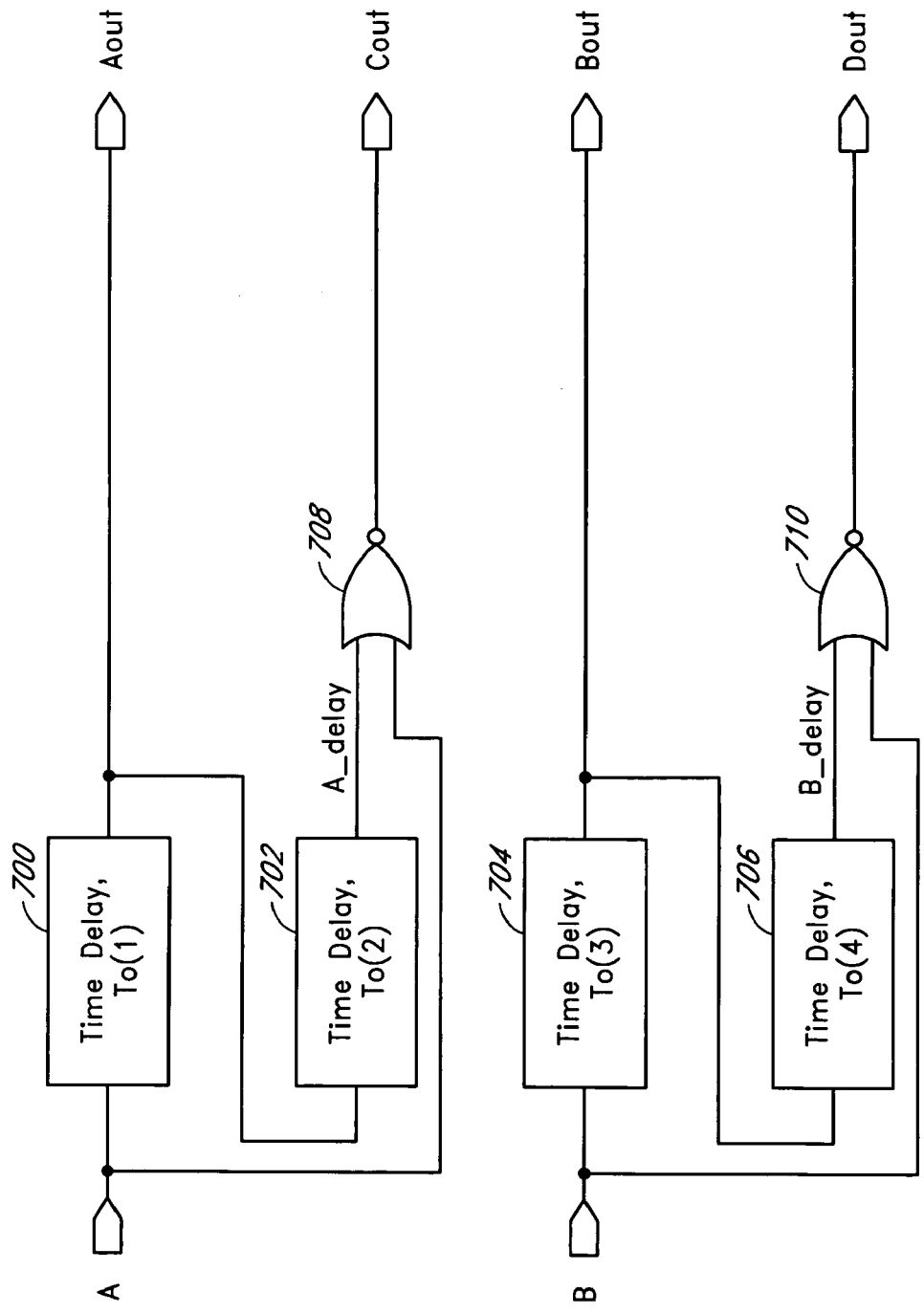
FIG. 7 illustrates one embodiment of a controller circuit for generating the driving waveforms shown in FIG. 6.

FIG. 7 illustrates one embodiment of a controller circuit for generating the driving waveforms shown in FIG. 6. The controller circuit of FIG. 7 accepts two input signals (A, B) with overlapping logic low levels (or inactive states) and generates four driving signals (Aout, Bout, Cout, Dout). For example, the two input signals are substantially similar to the driving signals shown in FIG. 2 for driving a half-bridge switching network. The first and the second driving signals (Aout, Bout) also have overlapping logic low levels (or inactive states).

In one embodiment, a first delay circuit 700 and a second delay circuit 702 are coupled in series to the first input signal (A) to generate the first driving signal (Aout) and the third driving signal (Cout). For example, the first delay circuit 700 receives the first input signal and delays the first input signal by a first time delay (To(1)) to generate the first driving signal. The second delay circuit 702 receives the first driving signal and adds a second time delay (To(2)) to generate a first twice-delayed signal (A_delay). The first twice-delayed signal and the first input signal are provided to a first logic OR circuit (or gate) 708 to generate the third driving signal.

In a similar configuration, a third delay circuit 704 and a fourth delay circuit 706 are coupled in series to the second input signal (B) to generate the second driving signal (Bout) and the fourth driving signal (Dout). For example, the third delay circuit 704 receives the second input signal and delays the second input signal by a third time delay (To(3)) to generate the second driving signal. The fourth delay circuit 706 receives the second driving signal and adds a fourth time delay (To(4)) to generate a second twice-delayed signal (B_delay). The second twice-delayed signal and the second input signal are provided to a second logic OR circuit 710 to generate the fourth driving signal. The time delays for the respective delay circuits 700, 702, 704, 706 can be substantially identical or different.

Figure 8:
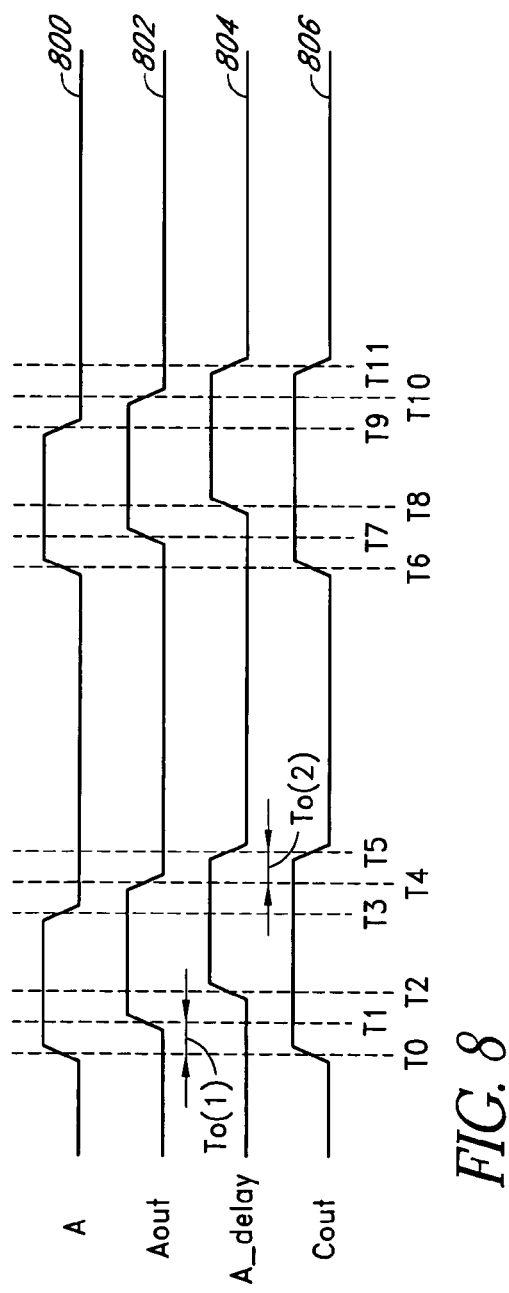
FIG. 8 is a timing diagram for some signals in the controller circuit of FIG. 7.

FIG. 8 is a timing diagram for some signals in the controller circuit of FIG. 7. A graph 800 shows the first input signal (A) with respect to time. A graph 802 shows the first driving signal (Aout) with respect to time. A graph 804 shows the first twice-delayed signal (A_delay) with respect to time. Finally, a graph 806 shows the third driving signal (Cout) with respect to time.

The first input signal has periodic active states or periods of logic high levels (e.g., from times T0–T3 and T6–T9). The first driving signal substantially follows the first input signal with leading and trailing edge transitions delayed by the first time delay (To(1)). The first twice-delayed signal substantially follows the first driving signal with leading and trailing edge transitions further delayed by the second time delay (To(2)). The third driving signal has leading edge transitions follow the leading edge transitions of the first input signal and trailing edge transitions follow the trailing edge transitions of the first twice-delayed signal. Thus, the third driving signal has leading edge transitions that precede the leading edge transitions of the first driving signal by the first time delay and trailing edge transitions that succeed the trailing edge transitions of the first driving signal by the second time delay.

One possible disadvantage of the controller circuit shown in FIG. 7 is limited duty cycle for the driving signals. The pulse width of the input signals cannot be shorter than any of the time delays. In other words, duration of conduction states (e.g., logic high periods for the first driving signal) cannot be shorter than duration of transition states (e.g., delay in edge transitions between the first and the third driving signals or time delays of the delay circuits 700, 702, 704, 706).

Figure 9:
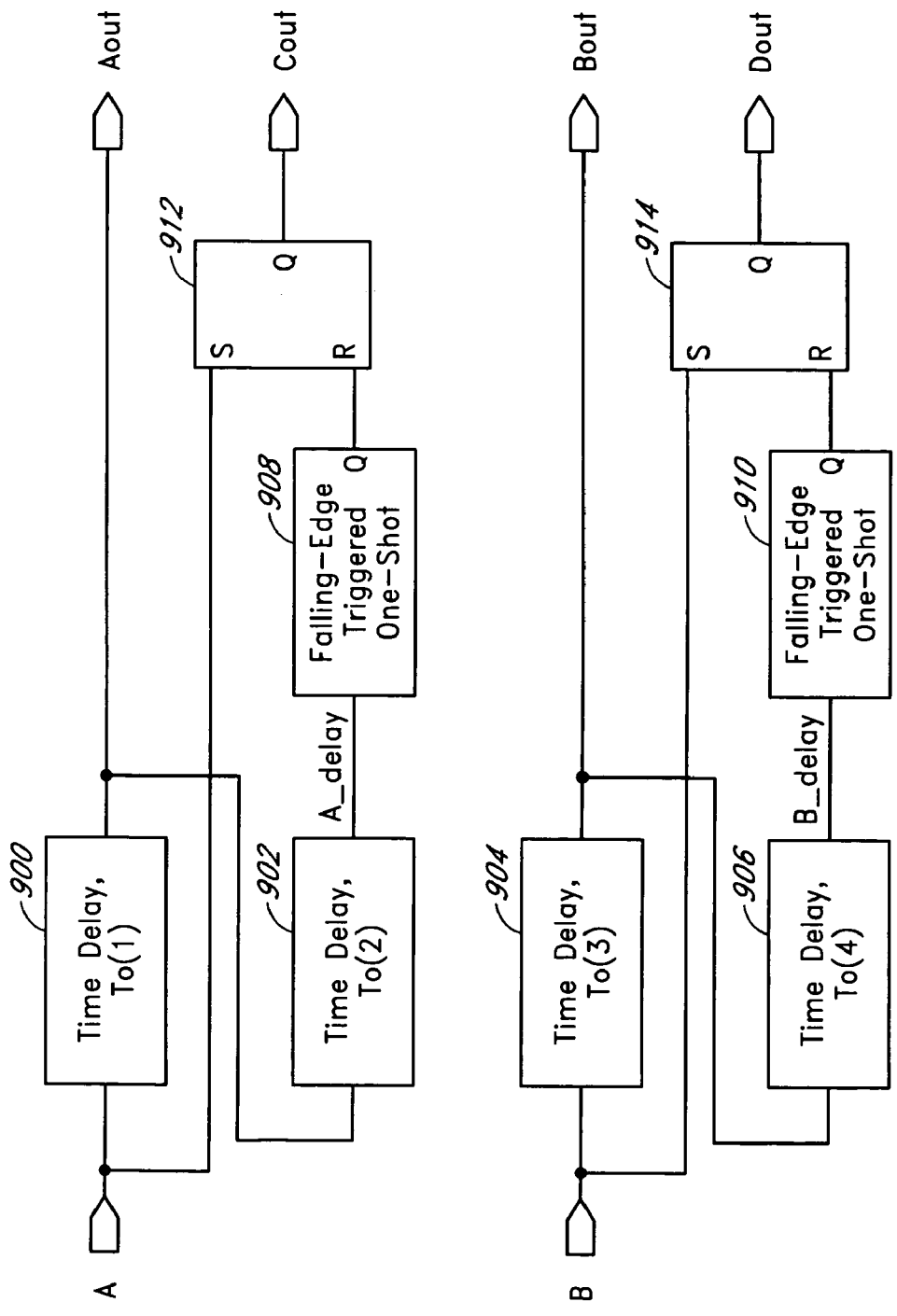
FIG. 9 illustrates another embodiment of a controller circuit for generating the driving waveforms shown in FIG. 6.

FIG. 9 illustrates another embodiment of a controller circuit for generating the driving waveforms shown in FIG. 6. The circuit implementation of FIG. 9 advantageously allows the duration of the conduction states to be shorter than the durations of the transition states. A first delay circuit 900 and a second delay circuit 902 are coupled in series to a first input signal (A) to generate a first driving signal (Aout) and a third driving signal (Cout). For example, the first delay circuit 900 receives the first input signal and adds a first time delay (To(1)) to generate the first driving signal. The second delay circuit 902 receives an output of the first delay circuit 900 and adds a second time delay (To(2)) to generate a first twice-delayed signal (A_delay). The first twice-delayed signal is provided to a first one-shot circuit (e.g., a falling edge-triggered monostable circuit) 908. An output of the first one-short circuit 908 is provided to a reset terminal of a first SR latch 912. The first input signal is provided to a set terminal of the first SR latch 912. The first SR latch 912 outputs the third driving signal (e.g., at its Q output).

In a similar configuration, a third delay circuit 904 and a fourth delay circuit 906 are coupled in series to a second input signal (B) to generate a second driving signal (Bout) and a fourth driving signal (Dout). For example, the third delay circuit 904 receives the second input signal and adds a third time delay (To(3)) to generate the second driving signal. The fourth delay circuit 906 receives an output of the third delay circuit 904 and adds a fourth time delay (To(4)) to generate a second twice-delayed signal (B_delay). The second twice-delayed signal is provided to a second one-shot circuit 910. An output of the second one-shot circuit 910 is provided to a reset terminal of a second SR latch 914. The second input signal is provided to a set terminal of the second SR latch 914. The second SR latch 914 outputs the fourth driving signal.

Figure 10:
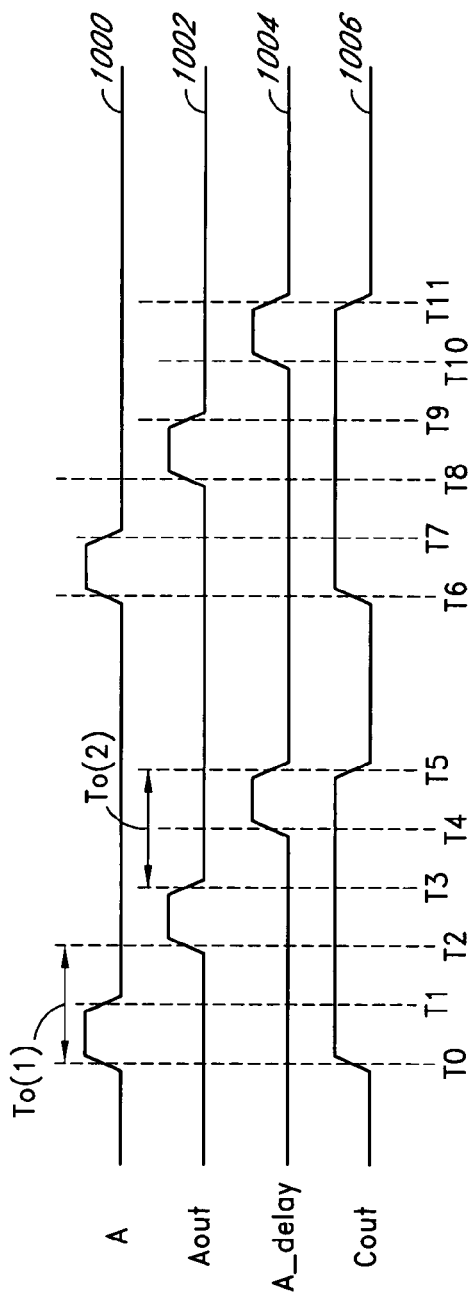
FIG. 10 is a timing diagram for some signals in the controller circuit of FIG. 9.

FIG. 10 is a timing diagram for some signals in the controller circuit of FIG. 9. A graph 1000 shows the first input signal (A) with respect to time. A graph 1002 shows the first driving signal (Aout) with respect to time. A graph 1004 shows the first twice-delayed signal with respect to time. Finally, a graph 1006 shows the third driving signal (Cout) with respect to time.

The first input signal has periodic durations of logic high levels (e.g., from times T0–T1 and T6–T7). The first driving signal substantially follows the first input signal with rising and falling edge transitions delayed by the first time delay (To(1)). The first twice-delayed signal substantially follows the first driving signal with rising and falling edge transitions further delayed by the second time delay (To(2)). In the timing diagrams shown in FIG. 10, the logic high duration of the first input signal is less than the duration of the first time delay or the second time delay. The rising edge of the first input signal sets the rising edge of the third driving signal and the first SR latch 912 holds the logic high level of the third driving signal until the falling edge of the first twice-delayed signal resets the first SR latch 912 using the first one-shot circuit 908. Thus, similar to the circuit implementation of FIG. 7, the third driving signal has rising edge transitions that precede the rising edge transitions of the first driving signal by the first time delay and falling edge transitions that succeed the falling edge transitions of the first driving signal by the second time delay. However, unlike the circuit implementation of FIG. 7, the circuit implementation of FIG. 9 does not have a duty cycle limitation.

FIGS. 11(a)–11(h) illustrate another embodiment of a periodic timing sequence for a full-bridge switching network that further improves power efficiency. FIGS. 11(a)–11(h) are substantially similar to FIGS. 5(a)–5(h) with exception of the idle states shown in FIGS. 5(c) and 5(g). As described above, no net current flows out of the power source during the idle (or power-off) states. However, current is flowing through the primary winding of the transformer 308 and power continues to be delivered to the lamp load 310. The power delivered to the lamp load 310 during the power-off states comes from energy stored in the leakage inductance of the transformer 308. During the power-off states, power efficiency is limited by the on-resistance of conducting transistors. The conducting transistors in FIGS. 5(c) and 5(g) are the third and the fourth power transistors 304, 306, which are PFETs. It is often easier and cheaper to find NFETs with lower on-resistance than PFETs.

Figure 11A:
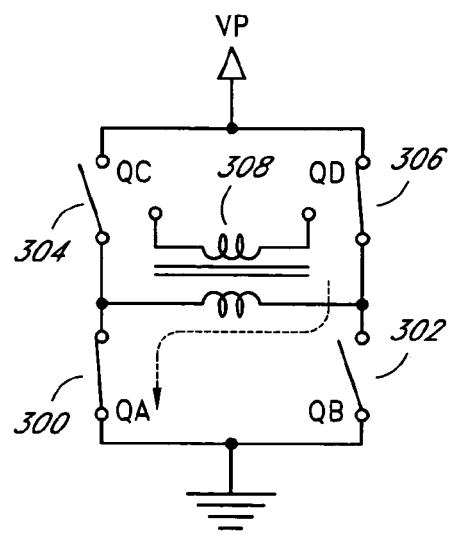
FIGS. 11(a)–11(h) illustrates another embodiment of a periodic timing sequence for a full-bridge switching network that further improves power efficiency.
Figure 11B:
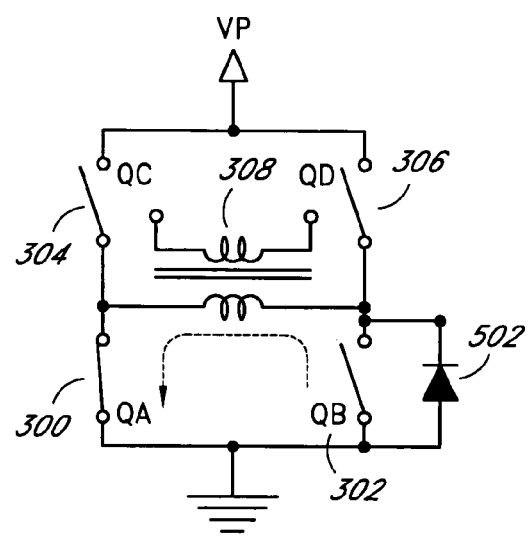
Figure 11C:
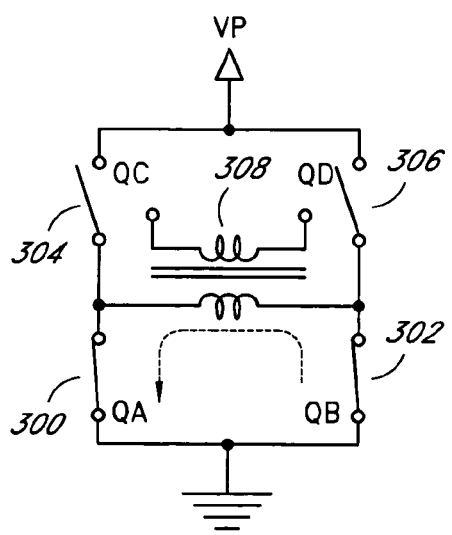
Figure 11D:
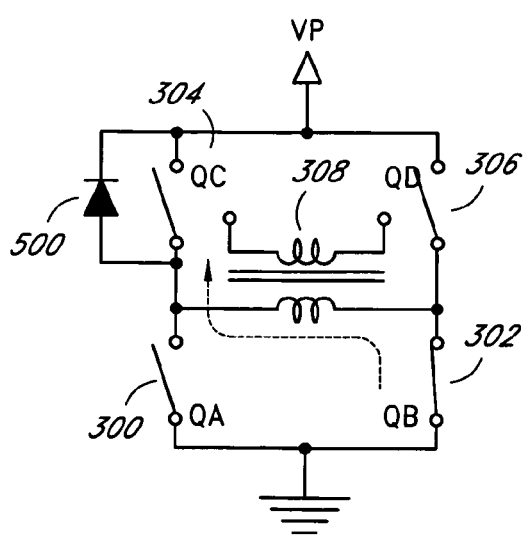

FIGS. 11(a)–11(h) shows the periodic timing sequence in which the first and the second power transistors (e.g., NFETs) 300, 302 are on during the power-off states to further improve power efficiency. For example, FIG. 11(a) illustrates a first conduction state in which the first transistor (QA) 300 and the fourth power transistor (QD) 306 are on while the second transistor (QB) 302 and the third power transistor (QC) 304 are off to allow power to flow from the power source (VP) to the lamp load 310 in a first polarity. For example, current flows from the power source through the fourth power transistor 306, through the primary winding of the transformer 308 and through the first power transistor 300 to ground during the first conduction state. FIGS. 11(b)–11(d) illustrate intermediate steps to transition from the first conduction state to a second conduction state illustrated in FIG. 11(e).

FIG. 11(b) shows a first transition state, following the first conduction state, in which the fourth power transistor 306 turns off. Because of leakage inductance associated with the transformer 308, the current through the primary winding of the transformer 308 does not stop instantaneously. The current flowing through the primary winding of the transformer 308 finds a path to ground through a body diode 502 of the second power transistor 302. The body diode 502 has a cathode coupled to the second terminal of the primary winding and an anode coupled to ground. With the body diode 502 conducting, the source-to-drain voltage of the second power transistor 302 is relatively low (e.g., approximately 0.7 volt or one diode voltage drop).

FIG. 11(c) shows a first idle state, following the first transition state, in which the second power transistor 302 turns on. FIG. 11(d) shows a second transition state, following the first idle state, in which the first power transistor 300 turns off. Similar to the first transition step, the current flowing through the primary winding of the transformer 308 does not stop abruptly. The current flowing through the primary winding of the transformer 308 finds a path through a body diode 500 of the third power transistor 304 back to the power source. The body diode 500 has a cathode coupled to the power source and an anode coupled to the first terminal of the primary winding.

Figure 11E:
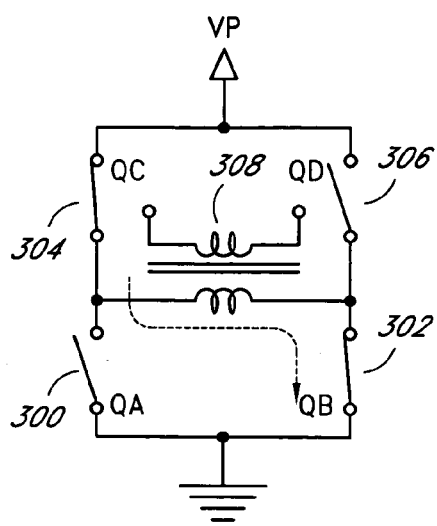

FIG. 11(e) shows the second conduction state, following the second transition state, in which the third power transistor 304 turns on to allow power to flow from the power source to the lamp load 310 in a second polarity. The third power transistor 302 turns on after its body diode 500 starts conducting to take advantage of reduced-voltage switching. In the second conductions state, current flows from the power source through the third power transistor 304, through the primary winding of the transformer 308 and through the second power transistor 302 to ground. The current flows in opposite directions through the primary winding of the transformer 308 between the first and the second conduction states.

Figure 11F:
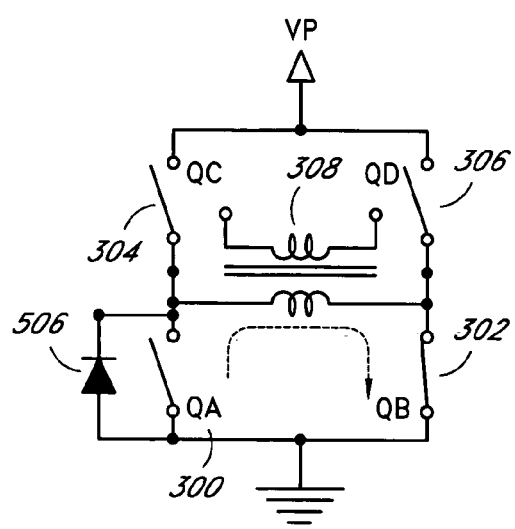
Figure 11G:
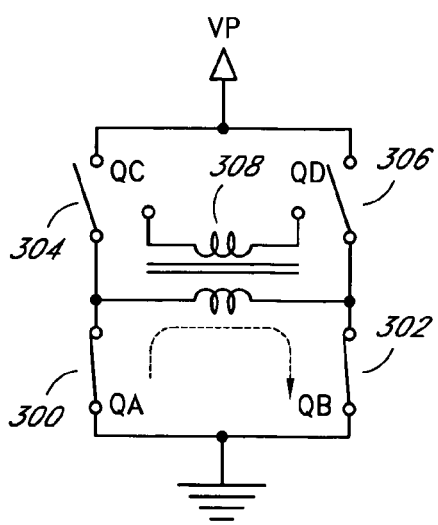
Figure 11H:
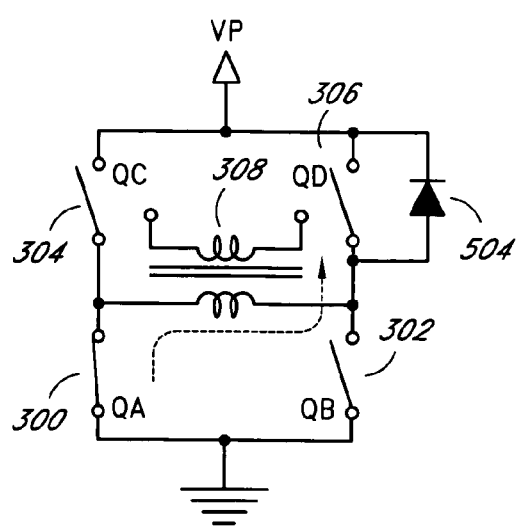

FIGS. 11(f)–11(h) illustrate another set of intermediate steps, following the same principles shown in FIG. 11(b)–11(d), to transition from the second conduction state back to the first conduction state. For example, FIG. 11(f) shows a third transition state, following the second conduction state, in which the third power transistor 304 turns off and the current flowing the primary winding of the transformer 308 finds a path to ground through a body diode 506 of the first power transistor 300. The body diode 506 has a cathode coupled to the first terminal of the primary winding and an anode coupled to ground. FIG. 11(g) shows a second idle state, following the third transition state, in which the first power transistor 300 turns on using zero-voltage switching. Thus, NFETs with relatively lower on-resistance are conducting during the first and the second idle states.

FIG. 11(h) shows a fourth transition state, following the second idle state, in which the second power transistor 302 turns off and the current flowing through the primary winding of the transformer 308 finds a path to the power source through a body diode 504 of the fourth power transistor 306. The body diode 504 has a cathode coupled to the power source and an anode coupled to the second terminal of the primary winding. The fourth power transistor 306 turns on using zero-voltage switching in the next step of the periodic timing sequence to return to the first conduction state.

Figure 12:
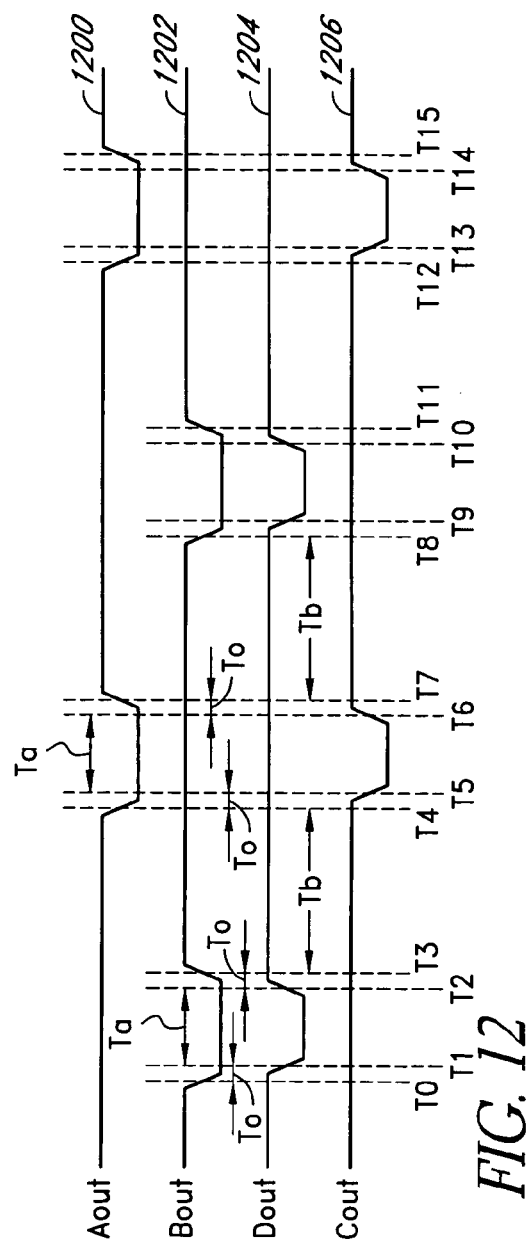
FIG. 12 illustrates one embodiment of driving waveforms to control transistors in a full-bridge switching network in accordance with the periodic timing sequence depicted in FIGS. 11(a)–11(h).

FIG. 12 illustrates one embodiment of driving waveforms to control transistors in a full-bridge switching network in accordance with the periodic timing sequence depicted in FIGS. 11(a)–11(h). For example, a controller outputs four driving signals to flexibly drive either a half-bridge or a full-bridge switching network using a reduced-voltage (or zero-voltage) switching technique. A graph 1200 shows a first driving signal (Aout) with respect to time. A graph 1202 shows a second driving signal (Bout) with respect to time. A graph 1204 shows a fourth driving signal (Dout) with respect to time. Finally a graph 1206 shows a third driving signal (Cout) with respect to time.

The driving signals shown in FIG. 12 are substantially similar to the driving signals shown in FIG. 6 except the first and the second driving signals have overlapping active states (e.g., from times T3–T4, T7–T8 and T11–T12) while the third and the fourth driving signals have overlapping inactive states to allow the first and the second power transistors (NFETs) 300, 302 to conduct during the idle states. The first and the second driving signals have substantially identical active and inactive durations phase-shifted by approximately 180°. The third and the first driving signals have tracking logic levels (or opposite states) and transition overlaps. That is, the leading edges of the third driving signal precedes the respective leading edges of the first driving signal by a first overlap duration (e.g., from time T6–T7 or T14–T15) and the trailing edges of the third driving signal succeeds the respective trailing edges of the first driving signal by a second overlap duration (e.g., from time T4–T5 or T12–T13). The second and the fourth driving signals also have tracking logic levels and transition overlaps. That is, the leading edges of the fourth driving signal precedes the respective leading edges of the second driving signal by a third overlap duration (e.g., from time T2–T3 or T10–T11) and the trailing edges of the fourth driving signal succeeds the respective trailing edges of the second driving signal by a fourth overlap duration (e.g., from time T0–T1 or T8–T9).

Figure 13:
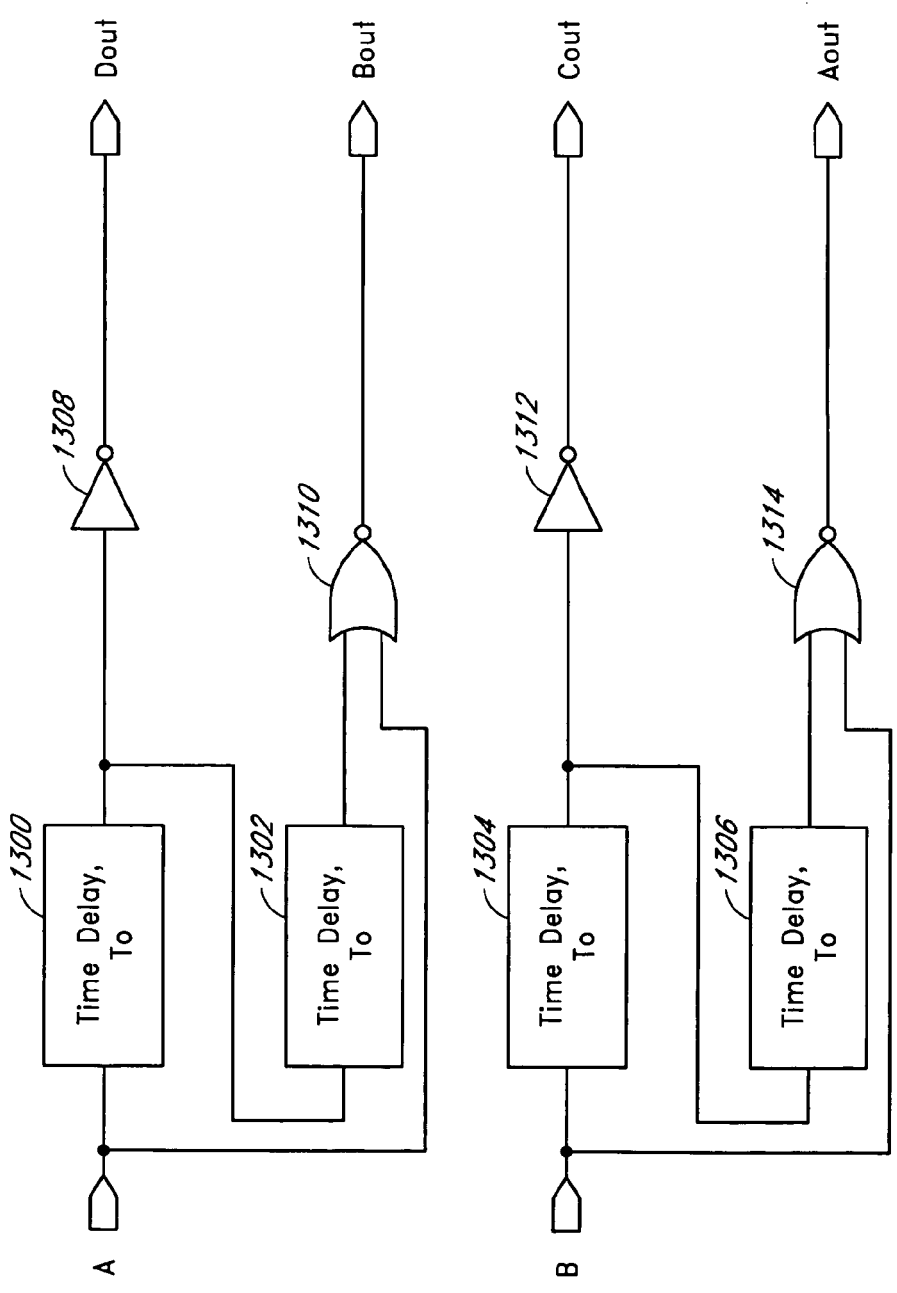
FIG. 13 illustrates one embodiment of a controller circuit for generating the driving waveforms shown in FIG. 12.

FIG. 13 illustrates one embodiment of a controller circuit for generating the driving waveforms shown in FIG. 12. The controller circuit of FIG. 13 accepts two input signals (A, B) with overlapping logic low levels and generates four driving signals (Aout, Bout, Cout, Dout). In one embodiment, the two input signals are substantially similar to driving signals for driving a half-bridge switching network. The first and the second driving signals (Aout, Bout) have overlapping logic high levels (or active states) in the controller circuit of FIG. 13.

In one embodiment, a first delay circuit 1300 and a second delay circuit 1302 are coupled in series to the first input signal (A) to generate the second driving signal (Bout) and the fourth driving signal (Dout). For example, the first delay circuit 1300 receives the first input signal and delays the first input signal by a first time delay. A first inverter 1308 is coupled to an output of the first delay circuit 1300 to generate the fourth driving signal. The second delay circuit 1302 is coupled to the output of first delay circuit 1300 and adds a second time delay to generate a first twice-delayed signal. The first twice-delayed signal and the first input signal are provided to a first logic NOR circuit (or gate) 1310 to generate the second driving signal.

In a similar configuration, a third delay circuit 1304 and a fourth delay circuit 1306 are coupled in series to the second input signal (B) to generate the first driving signal (Aout) and the third driving signal (Cout). For example, the third delay circuit 1304 receives the second input signal and delays the second input signal by a third time delay. A second inverter 1312 is coupled to an output of the third delay circuit 1304 to generate the third driving signal. The fourth delay circuit 1306 is coupled to the output of the third delay circuit 1304 and adds a fourth time delay to generate a second twice-delayed signal. The second twice-delayed signal and the second input signal are provided to a second logic NOR circuit 1314 to generate the first driving signal. The time delays for the respective delay circuits 1300, 1302, 1304, 1306 can be substantially identical (e.g., To) or different.

Figure 14:
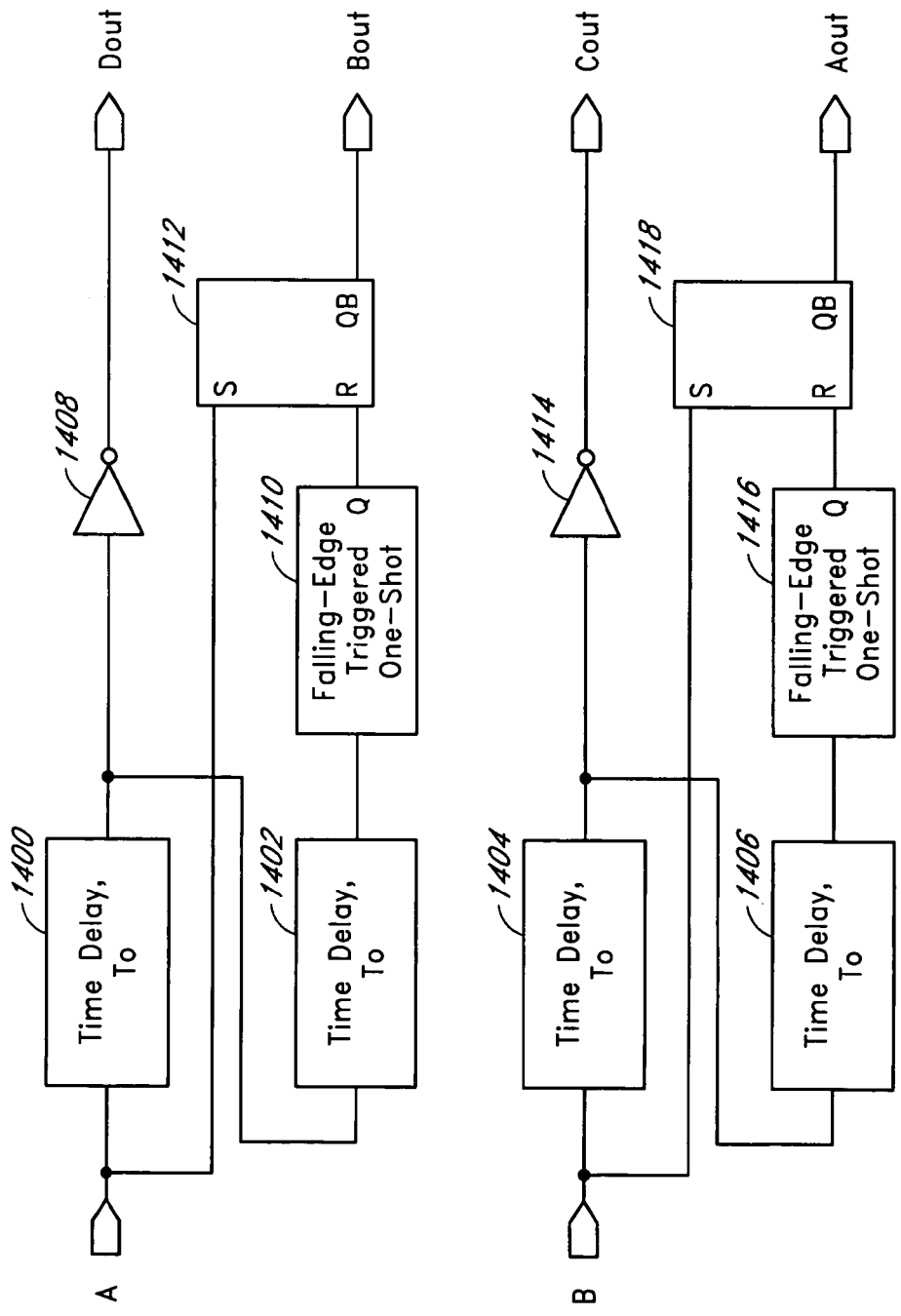
FIG. 14 illustrates another embodiment of a controller circuit for generating the driving waveforms shown in FIG. 12.

FIG. 14 illustrates another embodiment of a controller circuit for generating the driving waveforms shown in FIG. 12. A first delay circuit 1400 and a second delay circuit 1402 are coupled in series to a first input signal (A) to generate a second driving signal (Bout) and a fourth driving signal (Dout). For example, the first delay circuit 1400 receives the first input signal and adds a first time delay. A first inverter is coupled to an output of the first delay circuit 1400 to generate the fourth driving signal. The second delay circuit 1402 receives the output of the first delay circuit 1400 and adds a second time delay to generate a first twice-delayed signal. The first twice-delayed signal is provided to a first one-shot circuit 1410. An output of the first one-short circuit 1410 is provided to a reset terminal of a first latch 1412. The first input signal is provided to a set terminal of the first latch 1412. The first latch 1412 outputs the second driving signal (e.g., at its QB output).

In a similar configuration, a third delay circuit 1404 and a fourth delay circuit 1406 are coupled in series to a second input signal (B) to generate a first driving signal (Aout) and a third driving signal (Cout). For example, the third delay circuit 1404 receives the second input signal and adds a third time delay. A second inverter 1414 is coupled to an output of the third delay circuit 1404 to generate the third driving signal. The fourth delay circuit 1406 receives the output of the third delay circuit 1404 and adds a fourth time delay to generate a second twice-delayed signal. The second twice-delayed signal is provided to a second one-shot circuit 1416. An output of the second one-shot circuit 1416 is provided to a reset terminal of a second latch 1418. The second input signal is provided to a set terminal of the second latch 1418. The second latch 1418 outputs the first driving signal. The circuit implementation of FIG. 14 advantageously has no limitation on the duty cycle of the driving signals.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined by the appended claims.

What is claimed is:

1. A controller for driving a switching network in a backlight inverter, the controller comprising:
   a first output configured to provide a first driving signal with periodic active and inactive states, wherein the first driving signal has a variable duty-cycle that determines relative durations of the active and the inactive states;
   a second output configured to provide a second driving signal, wherein the second driving signal has a substantially identical duty-cycle as the first driving signal and active states of the second driving signal are phase shifted by approximately 180° with respect to the active states of the first driving signal;
   a third output configured to provide a third driving signal that substantially follows the first driving signal with opposite states and transition overlaps such that the third driving signal transitions from an active state to an inactive state before the first driving signal transitions from an inactive state to an active state and the third driving signal transitions from an inactive state to an active state after the first driving signal transitions from an active state to an inactive state; and
   a fourth output configured to provide a fourth driving signal that substantially follows the second driving signal with opposite states and transition overlaps such that the fourth driving signal transitions from an active state to an inactive state before the second driving signal transitions from an inactive state to an active state and the fourth driving signal transitions from an inactive state to an active state after the second driving signal transitions from an active state to an inactive state.

2. The controller of claim 1, wherein the first driving signal and the second driving signal respectively drive a first semiconductor switch and a second semiconductor switch arranged in a half-bridge switching network, power flows from a supply source to a lamp in a first polarity when the first semiconductor switch is on and the second semiconductor switch is off, power flows from the supply source to the lamp in a second polarity when the second semiconductor switch is on and the first semiconductor switch is off, and substantially no power flows from the supply source to the lamp when the first semiconductor switch and the second semiconductor switch are both on or both off.

3. The controller of claim 1, wherein the driving signals respectively control four power transistors coupled to a primary winding of a transformer in a full-bridge configuration to generate an AC lamp signal for powering a lamp load coupled across a secondary winding of the transformer, the first driving signal controls the first power transistor coupled between a first terminal of the primary winding and ground, the second driving signal controls the second power transistor coupled between a second terminal of the primary winding and ground, the third driving signal controls the third power transistor coupled between a power source and the first terminal of the primary winding, and the fourth driving signal controls the fourth power transistor coupled between the power source and the second terminal of the primary winding.

4. The controller of claim 3, wherein the driving signals determine a periodic timing sequence for operating the power transistors with a zero-voltage switching technique to generate the AC lamp signal and the periodic timing sequence comprises:
   a first conduction state in which the first and the fourth power transistors are on while the second and the third power transistors are off to allow power to flow from the power source to the lamp load in a first polarity;
   a first transition state, following the first conduction state, in which the first power transistor turns off;
   a first idle state, following the first transition state, in which the third power transistor turns on;
   a second transition state, following the first idle state, in which the fourth power transistor turns off;
   a second conductions state, following the second transition state, in which the second power transistor turns on to allow power to flow from the power source to the lamp load in a second polarity;
   a third transition state, following the second conduction state, in which the second power transistor turns off;
   a second idle state, following the third transition state, in which the fourth power transistor turns on; and
   a fourth transition state, following the second idle state, in which the third power transistor turns off.

5. The controller of claim 1, wherein the first and the second driving signals have overlapping inactive states and the controller further comprises:
   a first delay circuit configured to receive a first input signal and to output the first driving signal;
   a second delay circuit configured to receive the first driving signal and to output a delayed version of the first driving signal;
   a first logic OR circuit configured to receive the delayed version of the first driving signal and the first input signal and to output the third driving signal;
   a third delay circuit configured to receive a second input signal and to output the second driving signal;
   a fourth delay circuit configured to receive the second driving signal and to output a delayed version of the second driving signal; and
   a second logic OR circuit configured to receive the delayed version of the second driving signal and the second input signal and to output the fourth driving signal.

6. The controller of claim 1, wherein the controller further comprises:
   a first delay circuit configured to generate the first driving signal from a first input signal;
   a second delay circuit configured to generate a delayed version of the first driving signal which is provided to an input of a first edge-triggered one-shot circuit;
   a first SR latch configured to generate the third driving signal with the first input signal coupled to a set terminal and an output of the first edge-triggered one-shot circuit coupled to a reset terminal;
   a third delay circuit configured to generate the second driving signal from a second input signal;
   a fourth delay circuit configured to generate a delayed version of the second driving signal which is provided to an input of a second edge-triggered one-shot circuit; and
   a second SR latch configured to generate the fourth driving signal with the second input signal coupled to a set terminal and an output of the second edge-triggered one-shot circuit coupled to a reset terminal.

7. The controller of claim 1, wherein logic high indicates active states for the first and the second driving signals while logic low indicates active states for the third and fourth driving signals.

8. The controller of claim 3, wherein the first and the second power transistors are N-type field-effect-transistors while the third and the fourth power transistors are P-type field-effect-transistors.

9. The controller of claim 3, wherein the lamp load comprises of one or more cold cathode fluorescent lamps.

10. The controller of claim 3, wherein the driving signals determine a periodic timing sequence for operating the power transistors with a reduced-voltage switching technique to generate the AC lamp signal and the periodic timing sequence comprises:
   a first conduction state in which the first and the fourth power transistors are on while the second and the third power transistors are off to allow power to flow from the power source to the lamp load in a first polarity;
   a first transition state, following the first conduction state, in which the fourth power transistor turns off;
   a first idle state, following the first transition state, in which the second power transistor turns on;
   a second transition state, following the first idle state, in which the first power transistor turns off;
   a second conduction state, following the second transition state, in which the third power transistor turns on to allow power to flow from the power source to the lamp load in a second polarity;
   a third transition state, following the second conduction state, in which the third power transistor turns off;
   a second idle state, following the third transition state, in which the first power transistor turns on; and
   a fourth transition state, following the second idle state, in which the second power transistor turns off.

11. The controller of claim 1, wherein the first and the second driving signals have overlapping active states and the controller further comprises:
   a first delay circuit and a second delay circuit coupled in series, wherein an input of the first delay circuit accepts a first input signal and an output of the first delay circuit is inverted to produce the fourth driving signal;
   a first logic NOR circuit with inputs respectively coupled to the first input signal and an output of the second delay circuit, wherein the first logic NOR circuit outputs the second driving signal;
   a third delay circuit and a fourth delay circuit coupled in series, wherein an input of the third delay circuit accepts a second input signal and an output of the third delay circuit is inverted to produce the third driving signal; and a second logic NOR circuit with inputs respectively coupled to the second input signal and an output of the fourth delay circuit, wherein the second logic NOR circuit outputs the first driving signal.

12. The controller of claim 1, wherein the first and the second driving signals have overlapping active states and the controller further comprises:

a first delay circuit and a second delay circuit coupled in series, wherein an input of the first delay circuit is coupled to a first input signal, an output of the first delay circuit is inverted to generate the fourth driving signal and an output of the second delay circuit is provided to an input of a first edge-triggered one-shot circuit;

a first SR latch configured to generate the second driving signal, wherein the first input signal is provided to a set terminal and an output of the first edge-triggered one-shot circuit is provided to a reset terminal;

a third delay circuit and a fourth delay circuit coupled in series, wherein an input of the third delay circuit is coupled to a second input signal, an output of the third delay circuit is inverted to generate the third driving signal and an output of the fourth delay circuit is provided to an input of a second edge-triggered one-shot circuit; and a second SR latch configured to generate the fourth driving signal, wherein the second input signal is provided to a set terminal and an output of the second edge-triggered one-shot circuit is provided to a reset terminal.

13. A method to flexibly control a half-bridge or a full-bridge switching network in a backlight inverter, the method comprising:

generating a first driving signal to control a first semiconductor switch, wherein the first driving signal has a variable duty-cycle;

generating a second driving signal to control a second semiconductor switch, wherein the second driving signal is substantially an 180° phase-shifted version of the first driving signal;

generating a third driving signal to control a third semiconductor switch, wherein the third driving signal and the first driving signal have opposing states such that the third semiconductor switch and the first semiconductor switch are alternately on, and the third driving signal and the first driving signal have state transition overlaps such that the third semiconductor switch turns off before the first semiconductor switch turns on and the third semiconductor switch turns on after the first semiconductor switch turns of; and generating a fourth driving signal to control a fourth semiconductor switch, wherein the fourth driving signal and the second driving signal have opposing states such that the fourth semiconductor switch and the second semiconductor switch are alternately on, and the fourth driving signal and the second driving signal have state transition overlaps such that the fourth semiconductor switch turns off before the second semiconductor turns on and the fourth semiconductor switch turns on after the second semiconductor switch turns off.

14. The method of claim 13, wherein the driving signals control the half-bridge switching network, power flows from a source to a lamp in a first polarity when the first driving signal is active, power flows from the source to the lamp in a second polarity when the second driving signal is active, and substantially no power flows from the source to the lamp when the first and the second driving signals are both active or both inactive.

15. The method of claim 13, wherein the driving signals control the full-bridge switching network, power flows from a source to a lamp in a first polarity during first conduction states when the first and the fourth driving signals are active, power flows from the source to the lamp in a second polarity during second conduction states when the second and the third driving signals are active, and substantially no power flows from the source to the lamp during idle states when the first and the second driving signals are active or when the third and the fourth driving signals are active.

16. The method of claim 13, wherein generating the first driving signal comprises delaying a first input signal by a first time delay, generating the third driving signal comprises ORing the first input signal with the first input signal delayed by the first time delay and a second time delay, generating the second driving signal comprises delaying a second input signal by a third time delay, and generating the fourth driving signal comprises ORing the second input signal with the second input signal delayed by the third time delay and a fourth time delay.

17. The method of claim 13, wherein the first driving signal is generated by adding a first time delay to a first input signal; the third driving signal is generated by setting a first latch with the first input signal and resetting the first latch with an output of a first one-shot circuit triggered by falling edges of the first driving signal with a second time delay; the second driving signal is generated by adding a third time delay to a second input signal; and the fourth driving signal is generated by setting a second latch with the second input signal and resetting the second latch with an output of a second one-shot circuit triggered by falling edges of the second driving signal with a fourth time delay.

18. The method of claim 13, wherein a first input signal is provided to a first delay circuit coupled in series with a second delay circuit, an output of the first delay circuit is inverted to generate the fourth driving signal, an output of the second delay circuit is logically NORed with the first input signal to generate the second driving signal, a second input signal is provided to a third delay circuit coupled in series with a fourth delay circuit, an output of the third delay circuit is inverted to generate the third driving signal, and an output of the fourth delay circuit is logically NORed with the second input signal to generate the first driving signal.

19. The method of claim 13, wherein a first input signal is provided to a first delay circuit coupled in series with a second delay circuit, the fourth driving signal is generated by inverting an output of the first delay circuit, the second driving signal is generated by setting a first latch with the first input signal and resetting the first latch with a first one-shot circuit triggered by an output of the second delay circuit, a second input signal is provided to a third delay circuit coupled in series with a fourth delay circuit, the third driving signal is generated by inverting an output of the third delay circuit, and the first driving signal is generated by setting a second latch with the second input signal and resetting the second latch with a second one-shot circuit triggered by an output of the fourth delay circuit.

20. An inverter controller comprising:

means for generating a first driving signal with a variable duty-cycle;

means for generating a second driving signal with substantially the same duty-cycle as the first driving signal and an approximately 180° phase shift from the first driving signal;

means for generating a third driving signal that substantially tracks the first driving signal with opposing states and transition overlaps such that the third driving signal transitions from an active state to an inactive state before the first driving signal transitions from an inactive state to an active state and the third driving signal transitions from an inactive state to an active state after the first driving signal transitions from an active state to an inactive state; and means for generating a fourth driving signal that substantially tracks the second driving signal with opposing states and transition overlaps such that the fourth driving signal transitions from an active state to an inactive state before the second driving signal transitions from an inactive state to an active state and the fourth driving signal transitions from an inactive state to an active state after the second driving signal transitions from an active state to an inactive state.

* * * * *